United States Patent
Hong et al.

(10) Patent No.: US 12,249,032 B2
(45) Date of Patent: Mar. 11, 2025

(54) COGNITIVE EXPERIMENT METHOD FOR PERIPHERY REGION QUALITY CHANGE FOR PARAMETER DETERMINATION OF FOVEATED HOLOGRAM

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Byoung Hyo Lee, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/013,317

(22) PCT Filed: Dec. 15, 2021

(86) PCT No.: PCT/KR2021/019022
§ 371 (c)(1),
(2) Date: Dec. 28, 2022

(87) PCT Pub. No.: WO2023/113059
PCT Pub. Date: Jun. 22, 2023

(65) Prior Publication Data
US 2024/0119673 A1    Apr. 11, 2024

(30) Foreign Application Priority Data
Dec. 13, 2021   (KR) .................. 10-2021-0177357

(51) Int. Cl.
*G06T 19/00* (2011.01)
*G03H 1/22* (2006.01)
*G06T 3/403* (2024.01)

(52) U.S. Cl.
CPC .......... *G06T 19/00* (2013.01); *G03H 1/2294* (2013.01); *G06T 3/403* (2013.01); *G06T 2200/24* (2013.01); *G06T 2210/36* (2013.01)

(58) Field of Classification Search
CPC .......... G06F 3/013; G06F 3/012; G06F 1/163; G06F 3/011; G03H 1/0808; G03H 1/0005;
(Continued)

(56) References Cited

U.S. PATENT DOCUMENTS

2017/0123492 A1* 5/2017 Marggraff ........... G06F 3/04845
2018/0261003 A1* 9/2018 Peli ........................ G06F 3/013
(Continued)

FOREIGN PATENT DOCUMENTS

JP          9-56674 A      3/1997
KR   10-2018-0082253 A    7/2018
(Continued)

OTHER PUBLICATIONS

Korean Office Action issued on May 31, 2023, in counterpart Korean Patent Application No. 10-2021-0177357 (2 pages in English, 4 pages in Korean).
(Continued)

*Primary Examiner* — Xilin Guo
(74) *Attorney, Agent, or Firm* — NSIP Law

(57) ABSTRACT

Provided is a cognitive experiment method for change in periphery region image quality for parameter determination of a foveated hologram. According to an embodiment, a cognitive experiment method for determining foveated image parameters includes: generating a foveated image which includes a foveal region and a periphery region while reducing image quality regarding the periphery region; displaying the generated foveated image; receiving an input of a response to image quality of the periphery region from
(Continued)

a subject; and collecting information regarding appropriate image quality of the periphery region, based on the response inputted by the subject. Accordingly, in applying a foveated hologram generation algorithm for real-time reproduction, various parameters such as a boundary between a foveal region image and a periphery region image in a foveated hologram, and a degree of quality degradation of the periphery region image may be appropriately determined through a cognitive experiment.

13 Claims, 6 Drawing Sheets

(58) Field of Classification Search
CPC ......... G03H 1/2294; G03H 2001/2236; G03H 2001/0816; G03H 2226/05; G06T 19/00; G06T 3/403; G06T 2210/36; G06T 2200/24; G06T 19/006; G06T 2207/30041; G06T 3/4053; G06T 7/11; G06T 7/20; H04N 13/383; H04N 13/344; H04N 19/119; G06V 40/193; G06V 40/18

See application file for complete search history.

(56) References Cited

U.S. PATENT DOCUMENTS

2018/0357749 A1* 12/2018 Young .................... G09G 5/391
2018/0357780 A1* 12/2018 Young .................... G06T 11/20
2022/0171968 A1*  6/2022 Li .......................... G06T 11/60

FOREIGN PATENT DOCUMENTS

KR    10-2021-0107408 A     9/2021
WO    WO 2020/261268 A1    12/2020

OTHER PUBLICATIONS

International Search Report issued on Aug. 23, 2022 in counterpart PCT/KR2021/019022 (3 pages in Korean).

* cited by examiner

COGNITIVE EXPERIMENT METHOD FOR
PERIPHERY REGION QUALITY CHANGE
FOR PARAMETER DETERMINATION OF
FOVEATED HOLOGRAM

CROSS REFERENCE TO RELATED APPLICATIONS

This application is a U.S. National Stage Application of International Application No. PCT/KR2021/019022, filed on Dec. 15, 2021, which claims the benefit under 35 USC 119(a) and 365(b) of Korean Patent Application No. 10-2021-0177357, filed on Dec. 13, 2021 in the Korean Intellectual Property Office, the entire disclosure of which is incorporated herein by reference for all purposes.

TECHNICAL FIELD

The present disclosure relates to a foveated hologram generation technology, and more particularly, to a method for conducting a cognitive experiment for periphery region quality change for parameter determination of a foveated hologram.

BACKGROUND ART

One of the related-art methods for generating a computer-generated hologram (CGH) is the method of expressing a target object by using a point cloud data set and then applying the Rayleigh-Sommerfeld diffraction integral equation as shown in FIG. 1.

In this case, if a complex amplitude of each point of a point cloud data set is indicated by $A_p = a_p e^{j\phi_p}$ and 3-dimensional (3D) coordinates of each point are indicated by $(x_p, y_p, z_p)$, a complex hologram generated by the point cloud data set may be expressed by $u(x, y) = \Sigma_p A_p h_p(x, y)$, and in this case, an impulse response $h_p(x, y)$ as to each point may be expressed by $$h_p(x, y) = \begin{cases} \dfrac{z}{j\lambda} \dfrac{\exp\left[-(z_p/|z_p|)jk\sqrt{(x-x_p)^2 + (y-y_p)^2 + z_p^2}\right]}{\left[(x-x_p)^2 + (y-y_p)^2 + z_p^2\right]}, & \dfrac{|x-x_p|}{\lambda_r} < \dfrac{1}{2p_x}, \dfrac{|y-y_p|}{\lambda_r} < \dfrac{1}{2p_y} \\ 0, & \text{otherwise} \end{cases}$$

In this case, r equals $\sqrt{(x-x_p)^2 + (y-y_p)^2 + z_p^2}$, and $p_x$, $p_y$ indicate pixel sizes in an x-direction, a y-direction on a hologram plane, respectively. The hologram generated through the Rayleigh-Sommerfeld diffraction integral may have advantages of a high degree of freedom in expressing a target object, and a very high accuracy of calculation of a complex field value, but there may be a demerit that a lot of calculation is required as 2-dimensional convolution is performed.

Another method of generating the CGH is the method of expressing a target object as a depth slice image and calculating a complex hologram therefrom as shown in FIG. 2.

This method divides a target object into a plurality of plane slice images. Therefore, when a complex hologram is generated for each slice image, plane-to-plane propagation may be applied like an angular spectrum method. When it is assumed that a target object $g(x, y, z)$ is divided into depth slice images according to the expression $g(x, y, z) = \Sigma_m g_m(x, y)$, the angular spectrum method is implemented by fast Fourier transform (FFT), and accordingly, appropriate zero-padding is required for each slice image $g_m(x, y)$. In this case, if the slice image undergoing zero-padding is $\bar{g}_m(x, y)$, a complex hologram generated by the depth slice images may be calculated by the equation $u(x, y) = \Sigma_m \mathfrak{J}^{-1}\{\bar{G}_m(f_x, f_y) H_m(f_x, f_y) \exp(jkz_m)\}$. In this case, $G(f_x, f_y) = \mathfrak{J}\{g(x, y)\}$, which indicates Fourier transform of the zero-padded slice image, and $$H(f_x, f_y) = \begin{cases} \exp\left[j2\pi\dfrac{z}{\lambda}\sqrt{1 - (\lambda f_x)^2 - (\lambda f_y)^2}\right], & \sqrt{f_x^2 + f_y^2} < \dfrac{1}{\lambda} \\ 0, & \text{otherwise} \end{cases}$$

In this case, $z_m$ is a distance of each slice image from the hologram plane. In this case, since each plane-to-plane propagation may utilize 2D-FFT, this method requires a small amount of computation compared to the Rayleigh-Sommerfeld diffraction integral, but, as the number of slice images expressing an object increases, 2D-FFT should be calculated as many times as the increasing number. Therefore, this method may be inefficient. In addition, a target object may be expressed by discontinuous planes, and there may be a demerit that accuracy in expressing an object is degraded.

As described above, the related-art CGH generation methods may require a large amount of computation and have difficulty in reproducing images in real time.

DISCLOSURE

Technical Problem

The present disclosure has been developed in order to address the above-discussed deficiencies of the prior art, and an object of the present disclosure is to provide a cognitive experiment method for determining a boundary of a periphery region of a foveated hologram and a degree of quality degradation in applying a foveated hologram generation algorithm for real-time reproduction.

Technical Solution

According to an embodiment of the present disclosure to achieve the above-described object, there is provided a cognitive experiment method for determining foveated image parameters, the method including: generating, by a foveated image generation system, a foveated image which includes a foveal region and a periphery region while reducing image quality regarding the periphery region; displaying, by a display system, the generated foveated image; receiving, by an input device, an input of a response to image quality of the periphery region from a subject; and collecting, by the foveated image generation system, information regarding appropriate image quality of the periphery region, based on the response inputted by the subject through the input device.

In addition, displaying may include reducing the image quality of the periphery region at a certain time.

Displaying may include reducing the image quality of the periphery region in phases from image quality of the foveal region.

Displaying may include displaying a mark for checking whether a gaze of the subject remains in the foveal region.

The mark may have a shape randomly changed at a certain time.

According to an embodiment of the present disclosure, the cognitive experiment method may further include receiving an input of a response as to a change state of the mark from the subject, and collecting may include, only when the response as to the change state is correct, collecting the information regarding the appropriate image quality of the periphery region based on the response inputted by the subject.

In addition, collecting may include, when the response as to the change state is not correct, not collecting the information regarding the appropriate image quality of the periphery region based on the response inputted by the subject.

In addition, collecting may include, when the response as to the change state is inputted after a predetermined time, not collecting the information regarding the appropriate image quality of the periphery region based on the response inputted by the subject.

In addition, displaying, inputting, and collecting may be repeatedly performed while changing at least one of a radius of a boundary between the foveal region and the periphery region and the subject.

According to another embodiment of the present disclosure, there is provided a cognitive experiment system for determining foveated image parameters, the system including: a foveated image generation system configured to generate a foveated image which includes a foveal region and a periphery region while reducing image quality regarding the periphery region; a display system configured to display the generated foveated image; and an input device configured to receive an input of a response to image quality of the periphery region from a subject, wherein the foveated image generation system is configured to collect information regarding appropriate image quality of the periphery region, based on the response inputted by the subject through the input device.

According to another embodiment of the present disclosure, there is provided an experiment method for determining foveated image parameters, the method including: displaying, by a foveated image system, a foveated image which includes a foveal region and a periphery region while reducing image quality regarding the periphery region; receiving, by the foveated image system, an input of a response as to the image quality of the periphery region from a subject; and collecting, by the foveated image system, information regarding appropriate image quality of the periphery region, based on the response inputted by the subject.

According to another embodiment of the present disclosure, there is provided a computer-readable recording medium having a program recorded thereon to perform an experiment method for determining foveated image parameters, the method including: displaying, by a foveated image system, a foveated image which includes a foveal region and a periphery region while reducing image quality regarding the periphery region; receiving, by the foveated image system, an input of a response as to the image quality of the periphery region from a subject; and collecting, by the foveated image system, information regarding appropriate image quality of the periphery region, based on the response inputted by the subject.

Advantageous Effects

According to embodiments of the present disclosure as described above, in applying a foveated hologram generation algorithm for real-time reproduction, various parameters such as a boundary between a foveal region image and a periphery region image in a foveated hologram, and a degree of quality degradation of the periphery region image may be appropriately determined through a cognitive experiment.

BEST MODE

Hereinafter, the present disclosure will be described in more detail with reference to the drawings.

Figure 1:
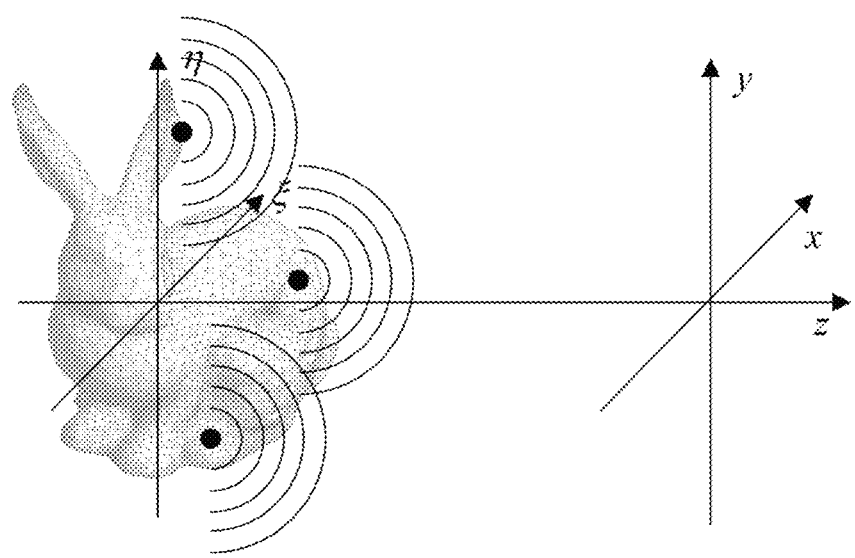
FIG. 1 is a view illustrating generation of a hologram by using a point cloud data set.
Figure 2:
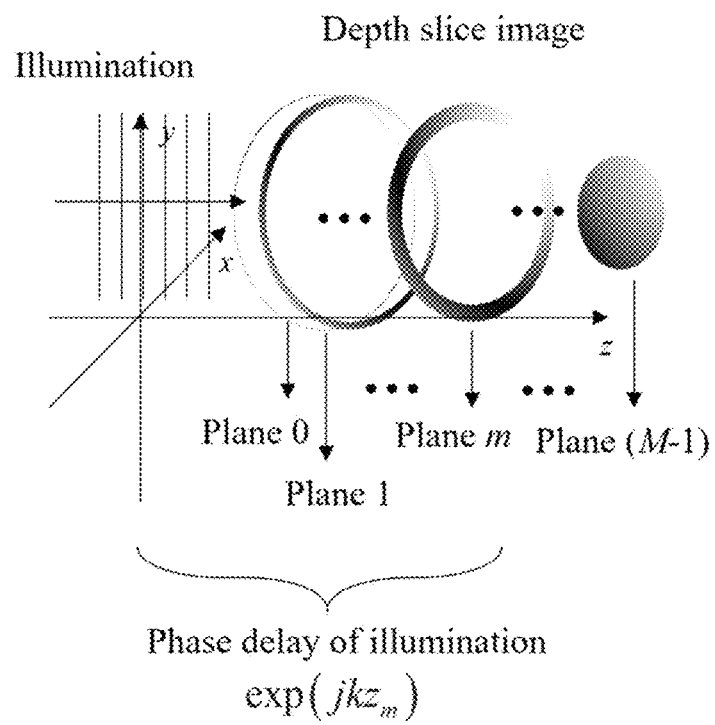
FIG. 2 is a view illustrating generation of a hologram by using depth slice images.
Figure 3:
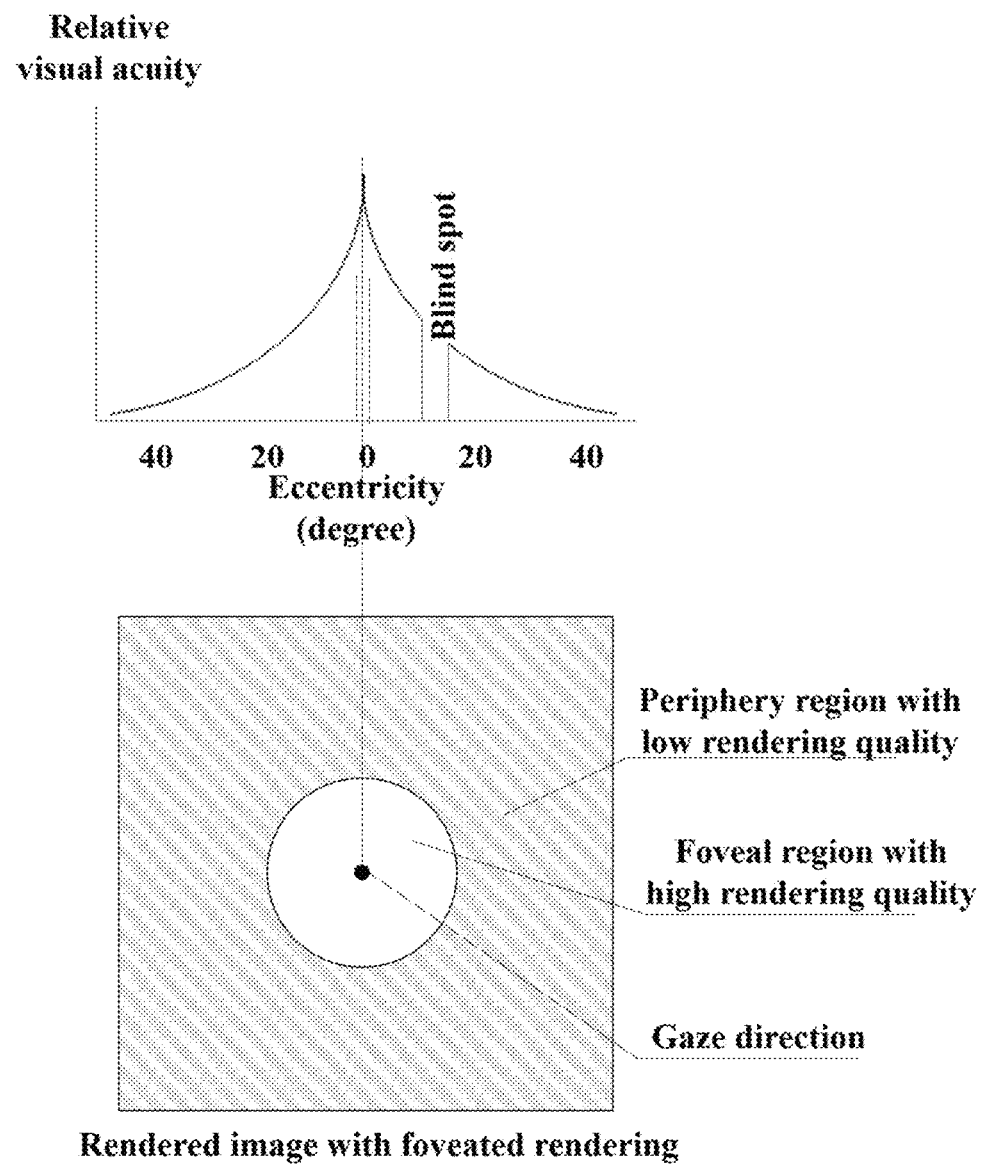
FIG. 3 is a view illustrating a concept of foveated rendering.

FIG. 3 shows a concept of foveated rendering. The foveated rendering refers to a technique that optimizes an amount of computation of image rendering by considering characteristics of the human visual system. As shown in FIG. 3, as a gaze point of the human visual system goes toward the foveal region, the visual acuity increases, and, as the gaze point goes toward the periphery region, the visual acuity decreases.

Accordingly, rather than rendering an image with respect to the field of view (FOV) of the human vision with totally equal quality, rendering an image in the foveal region with high quality and rendering an image in the periphery region with low quality to the extent that the human visual system cannot perceive is the method of efficiently using computation resources for image rendering.

This rendering method is called 'foveated rendering,' and in particular, is easy to apply to a case where relative positions of a display and user's eye are fixed like a near-eye display (NED), and it is easy to find a user's gaze direction.

The concept of the foveated rendering is applicable to generation of a hologram image. For example, when a hologram image is generated from point clouds, the number of point clouds and the size of a convolution kernel may influence a hologram image generating time. For example, for the peripheral region, the number of point clouds may be reduced or the size of the convolution kernel may be reduced.

However, problems of the foveated hologram generation method arise from difficulty in determining where to position a boundary between the foveal region and the periphery region, or how much image quality in the periphery region should be degraded.

Such parameters have no choice but to be obtained through a cognitive experiment on the human visual system, and may vary according to a target holographic display system and a hologram generation algorithm.

Accordingly, an embodiment of the present disclosure proposes a method for conducting a cognitive experiment to determine a boundary between the foveal region and the periphery region and to determine how much image quality in the periphery region should be degraded, in applying a foveated hologram generation algorithm.

In a cognitive experiment, a holographic display to which a foveated hologram generation algorithm is applied is configured and is shown to a subject. The experiment starts with hologram image quality of the periphery region being set to be the same as the foveal region, and, by detecting when the subject perceives degradation of image quality while reducing hologram image quality of the periphery region, the experiment finds a degree of image quality degradation regarding a radius of a given periphery region boundary when the subject perceives.

In addition, by conducting the experiment with a plurality of subjects on periphery region boundaries with various radii, a central tendency is found and is reflected on the foveated hologram generation algorithm.

Figure 4:
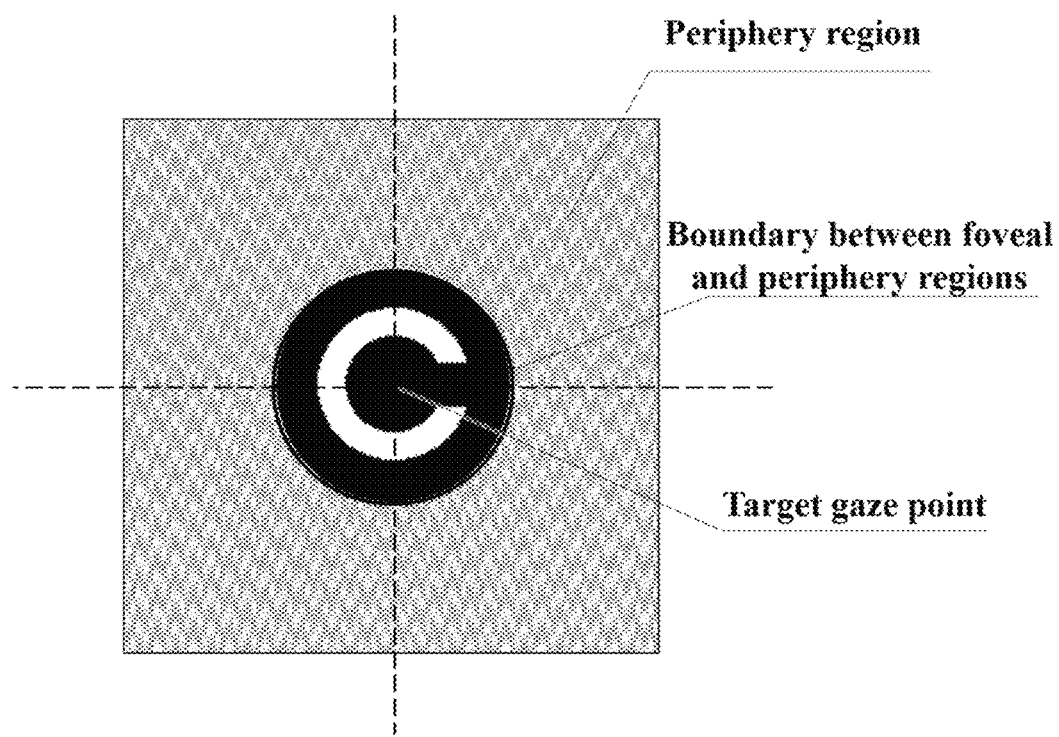
FIG. 4 is a view illustrating a method for configuring a screen for conducting a cognitive experiment for determining foveated hologram parameters according to an embodiment of the disclosure.

However, a problem of the experiment arises from difficulty in fixing a subject's gaze to a center of a screen. Accordingly, in an embodiment of the present disclosure, in order to fix a gaze to a center of a screen, a Landolt ring used for a visual acuity test is placed on the center of the screen as shown in FIG. 4, and the direction of the Landolt ring opening is changed randomly to four directions, upward/downward/leftward/rightward direction.

A task is assigned to the subject to continuously check the direction of the Landolt ring opening by using direction keys (▲/▼/◄ ►), enabling the subject to continuously fix the gaze to the center of the screen.

Figure 5:
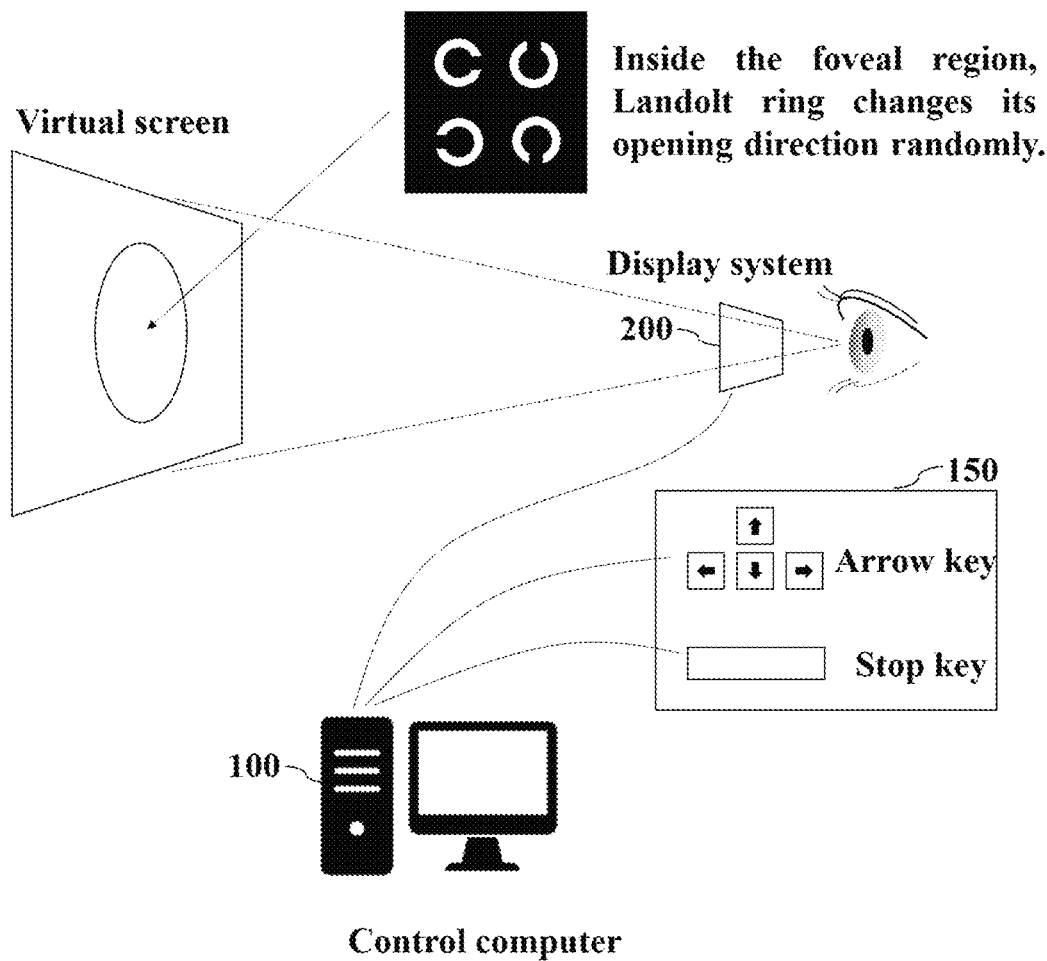
FIG. 5 is a view illustrating a configuration of a system for a cognitive experiment for determining foveated hologram parameters according to an embodiment of the disclosure.

FIG. 5 illustrates an overall configuration for conducting a cognitive experiment in the above-described method. FIG. 5 is a view illustrating a configuration of a cognitive experiment system for determining parameters of the periphery region of a foveated hologram according to an embodiment of the present disclosure.

The cognitive experiment system according to an embodiment of the present disclosure may include a foveated hologram generation system 100, an input device 150, and a holographic display system 200 as shown in FIG. 5.

The foveated hologram generation system 100 is a computing system that generates a foveated hologram for the cognitive experiment, and displays the foveated hologram through the holographic display system 200.

Specifically, the foveated hologram generation system 100 generates a foveated hologram in which a Landolt ring is displayed in the foveal region and a hologram image the quality of which gradually deteriorates is displayed in the periphery region.

The input device 150 is a device for receiving an input of a response to an opening direction of the Landolt ring, that is, a change in the Landolt ring, from the subject, and receiving an input of a response as to whether the subject perceives image quality degradation of the periphery region from the subject. The input device 150 may be implemented through a keyboard which is an input means of the foveated hologram generation system 100.

In the cognitive experiment process, the subject observes the hologram image through the holographic display system 200. In this case, the holographic display system 200 shows the hologram image on a virtual screen that is spaced apart therefrom by a predetermined distance. In this case, the Landolt ring image is brought up in the foveal region which is the center of the virtual screen, and the opening of the Landolt ring is randomly changed to four directions of upward/downward/leftward/rightward directions at a certain time. The subject is instructed to check the change of the opening direction of the Landolt ring through direction keys of four directions of the input device 150, and to press a stop key of the input device 150 when the subject feels image quality degradation of the periphery region.

Figure 6:
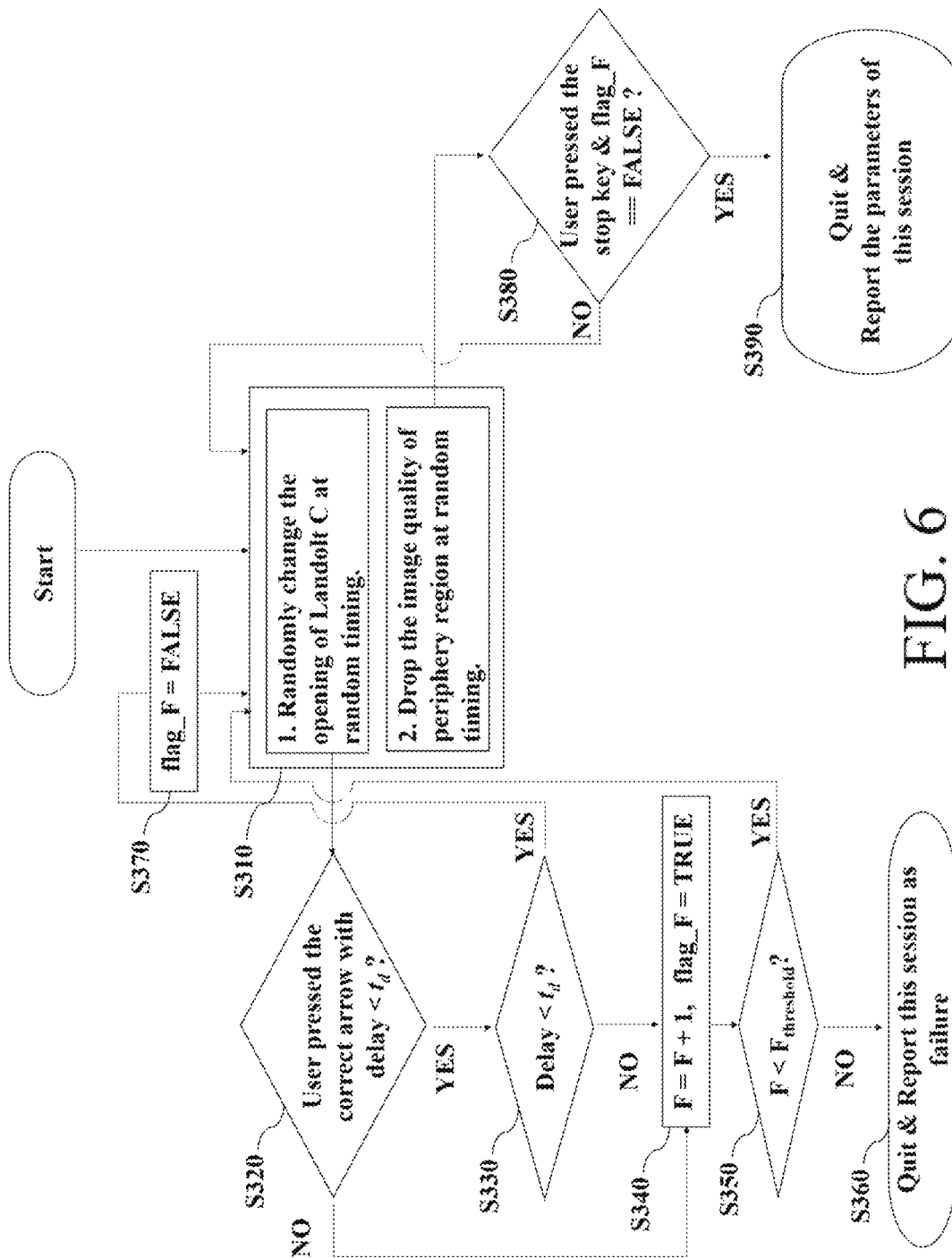
FIG. 6 is a sequence diagram illustrating a cognitive experiment method for determining foveated hologram parameters according to another embodiment of the disclosure.

FIG. 6 illustrates a sequence diagram of a cognitive experiment conducted through the above-described experiment system. First, when a radius of a boundary between the foveal region and the periphery region, on which the cognitive experiment will be conducted, is determined, the foveated hologram generation system 100 generates a Landolt ring in the foveal region and generates a certain hologram image in the periphery region, and displays the same on the holographic display system 200.

In addition, the holographic display system 200 randomly changes the opening direction of the Landolt ring at a certain point, and, independently of this, reduces hologram image quality of the periphery region in phases at a certain point (S310).

When the opening direction of the Landolt ring changes, the holographic display system 200 checks whether the subject presses a direction key of a correct direction within a pre-defined delay time to (S320 & S330), and, when the subject succeeds (S320—YES and S330—YES), the holographic display system 200 sets a value of flag_F to FLASE (S370), and then, resumes step S310.

However, when the subject fails to press a correct direction key within the defined time (S320—NO or S330—NO), the holographic display system 200 increases a count of the number of failures F and sets flag_F indicating a failure to TRUE (S340).

In this case, when a value of F does not exceed a pre-defined $F_{threshold}$ (S350—YES), the holographic display system 200 resumes step S310 to continue the experiment. However, when the value of F exceeds $F_{threshold}$ (S350—NO), the holographic display system 200 determines that the subject does not concentrate in the present session and reports a session failure, and quits the experiment (S360). In this case, the result of the experiment of the subject is not collected as information for determining foveated hologram parameters.

In addition, when the holographic display system 200 reduces image quality of the periphery region (S310), the holographic display system 200 checks whether the subject presses the stop key (S380), and, when the subject does not press the stop key (S380—NO), the holographic display system 200 determines that the subject does not feel image quality degradation, and continues proceeding with the experiment (S310).

When the subject presses the stop key but flag_F is TRUE (S380—NO), the holographic display system 200 determines that the subject does not currently fix the gaze to the center, and disregards the corresponding stop key being pressed and continues proceeding with the experiment (S310).

On the other hand, when flag_F is FALSE and the subject presses the stop key (S380—YES), the holographic display system 200 determines that the subject feels image quality degradation while fixing the gaze to the center of the screen, and finishes the session, and records parameters of the corresponding session, that is, a radius of the boundary of the periphery region and a degree of image quality degradation of the periphery region, and reports the same (S390). In this case, the result of the experiment of the subject may be collected as information for determining foveated hologram parameters.

By conducting the cognitive experiment with a plurality of subjects under various conditions, parameters for performing a foveated hologram image generation algorithm may be found.

Up to now, the cognitive experiment method for a change of image quality of the periphery region for parameter determination of a foveated hologram has been described in detail with reference to preferred embodiments.

Through the cognitive experiment proposed in the above-described embodiments, information to be referred to in determining various parameters, such as a radius of a boundary of the periphery region and a degree of hologram image quality degradation of the periphery region around the radius, may be collected in applying a foveated hologram generation algorithm.

The cognitive experiment method proposed in the embodiments of the present disclosure has been described mainly with respect to a hologram image, but it is applicable to development of all algorithms to which the concept of foveated rendering is normally applied, including not only a hologram image but also a normal image or a light field image.

The Landolt ring mentioned in the above-described embodiments is merely mentioned as a mark for checking whether the subject's gaze stays in the foveal region. The Landolt ring may be substituted with a mark of a different shape or type that performs the same function.

In addition, in the above-described embodiments, the foveated hologram generation system 100 and the holographic display system 200 are implemented as separate systems. However, integrating these systems into one system may be included in the scope of the present disclosure.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A cognitive experiment method for determining foveated image parameters, the method comprising:
    generating, by a foveated image generation system, a foveated image which comprises a foveal region and a periphery region while reducing image quality regarding the periphery region;
    displaying, by a display system, the generated foveated image;
    receiving, by an input device, an input of a response to image quality of the periphery region from a subject;
    collecting, by the foveated image generation system, information regarding appropriate image quality of the periphery region, based on the response inputted by the subject through the input device,
    wherein the displaying comprises displaying a mark for checking whether a gaze of the subject remains in the foveal region,
    wherein the mark has a shape randomly changed at a certain time; and
    receiving an input of a response as to a change state of the mark from the subject,
    wherein the collecting comprises, only when the response as to the change state is correct, collecting the information regarding the appropriate image quality of the periphery region based on the response inputted by the subject.

2. The cognitive experiment method of claim 1, wherein displaying comprises reducing the image quality of the periphery region at a certain time.

3. The cognitive experiment method of claim 2, wherein displaying comprises reducing the image quality of the periphery region in phases from image quality of the foveal region.

4. The cognitive experiment method of claim 1, wherein collecting comprises, when the response as to the change state is not correct, not collecting the information regarding the appropriate image quality of the periphery region based on the response inputted by the subject.

5. The cognitive experiment method of claim 1, wherein collecting comprises, when the response as to the change state is inputted after a predetermined time, not collecting the information regarding the appropriate image quality of the periphery region based on the response inputted by the subject.

6. The cognitive experiment method of claim 1, wherein displaying, inputting, and collecting are repeatedly performed while changing at least one of a radius of a boundary between the foveal region and the periphery region and the subject.

7. A cognitive experiment system for determining foveated image parameters, the system comprising:
    a foveated image generation system configured to generate a foveated image which comprises a foveal region and a periphery region while reducing image quality regarding the periphery region;
    a display system configured to display the generated foveated image, and display a mark for checking whether a gaze of a subject remains in the foveal region, wherein the mark has a shape randomly changed at a certain time; and
    an input device configured to receive an input of a first response to image quality of the periphery region from the subject, and receive an input of a second response as to a change state of the mark from the subject, wherein the foveated image generation system is configured to collect information regarding appropriate image quality of the periphery region, based on the first response inputted by the subject through the input device, wherein, for the collecting, the foveated image generation system is configured to, only when the response as to the change state is correct, collecting the information regarding the appropriate image quality of the periphery region based on the second response inputted by the subject.

8. The system of claim 7, wherein the display system is configured to reduce the image quality of the periphery region at a certain time.

9. The system of claim 8, wherein the display system is configured to reduce the image quality of the periphery region in phases from image quality of the foveal region.

10. The system of claim 7, wherein, for the collecting, the foveated image generation system is configured to, when the response as to the change state is not correct, not collect the information regarding the appropriate image quality of the periphery region based on the response inputted by the subject.

11. The system of claim 7, wherein, for the collecting, the foveated image generation system is configured to, when the response as to the change state is inputted after a predetermined time, not collect the information regarding the appropriate image quality of the periphery region based on the response inputted by the subject.

12. The system of claim 7, wherein the displaying, inputting, and collecting are repeatedly performed while changing at least one of a radius of a boundary between the foveal region and the periphery region and the subject.

13. An experiment method for determining foveated image parameters, the method comprising:

displaying, by a foveated image system, a foveated image which comprises a foveal region and a periphery region while reducing image quality regarding the periphery region;

displaying a mark for checking whether a gaze of a subject remains in the foveal region, wherein the mark has a shape randomly changed at a certain time;

receiving, by the foveated image system, an input of a first response as to the image quality of the periphery region from the subject;

receiving an input of a second response as to a change state of the mark from the subject; and collecting, by the foveated image system, information regarding appropriate image quality of the periphery region, based on the first response inputted by the subject, wherein the collecting comprises, only when the response as to the change state is correct, collecting the information regarding the appropriate image quality of the periphery region based on the second response inputted by the subject.

* * * * *